(12) United States Patent
Hongo et al.

(10) Patent No.: US 7,211,317 B2
(45) Date of Patent: *May 1, 2007

(54) LIGHT TRANSMITTING HARD COAT FILM FOR USE IN TOUCH PANELS

(75) Inventors: Yuki Hongo, Tokyo (JP); Satoru Shoshi, Saitama (JP); Yoshitaka Takesako, Hyogo (JP)

(73) Assignee: Lintec Corporation, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 10/713,209

(22) Filed: Nov. 17, 2003

(65) Prior Publication Data

US 2004/0105987 A1   Jun. 3, 2004

(30) Foreign Application Priority Data

Nov. 15, 2002   (JP) .............................. 2002-332842

(51) Int. Cl.
*B32B 7/02*   (2006.01)
*B32B 27/00*   (2006.01)

(52) U.S. Cl. ...................... 428/216; 428/215; 428/328; 428/331; 428/451; 428/697; 428/699; 428/701; 428/702

(58) Field of Classification Search ................ 428/215, 428/216, 328, 331, 451, 697, 699, 701, 702
See application file for complete search history.

(56) References Cited

U.S. PATENT DOCUMENTS

| | | | | |
|---|---|---|---|---|
| 5,472,798 A | * | 12/1995 | Kumazawa et al. | ........ 428/690 |
| 6,773,835 B2 | * | 8/2004 | Shoshi et al. | ............... 428/697 |
| 2002/0127408 A1 | * | 9/2002 | Nishida et al. | ............. 428/415 |

* cited by examiner

*Primary Examiner*—D. S. Nakarani
(74) *Attorney, Agent, or Firm*—Sughrue Mion, PLLC

(57) ABSTRACT

The present invention provides a light transmitting hard coat film for use in touch panels, which comprises: (A) a light transmitting hard coat layer composed of a cured product of an ionizing-radiation-curable compound; (B) a high refractive index layer composed of a cured product of an ionizing-radiation-curable compound and containing antimony-doped tin oxide plus zirconium oxide and/or titanium oxide, as metal oxides, which has a refractive index in the range of 1.65 to 1.90 and a thickness of 30 to 160 nm; and (C) a low refractive index layer composed of a cured product of a siloxane-based curable compound which has a refractive index in the range of 1.40 to 1.55 and a thickness of 10 to 50 nm, all the layers being laminated on one side of a light transmitting base film in this order. The light transmitting hard coat film for use in touch panels has a high light transmittance and can produce transmitted light of blue color.

4 Claims, 1 Drawing Sheet

LIGHT TRANSMITTING HARD COAT FILM FOR USE IN TOUCH PANELS

BACKGROUND OF THE INVENTION

1. Field of the Invention

The present invention relates to a light transmitting hard coat film for use in touch panels, in particular, to a light transmitting hard coat film for use in touch panels which has a high light transmittance and can produce transmitted light of blue color.

2. Description of the Related Art

Touch panels have been used for various applications such as ATMs installed in banks, ticket machines and information terminals in railroad stations, boarding procedure terminals in airports and electronic organizers. Touching the surface of the touch panels with a finger or a pen, etc. makes it possible for the touched input position to be recorded by the above machines or terminals, etc.

A typical analog type of touch panels have a structure in which a first transparent conductive film is laminated on the surface of a glass board, a microdot spacer is formed on the surface of the first transparent conductive film, a second transparent conductive film is laminated on the first transparent conductive film with a space left between the first and the second transparent conductive films; and a transparent film is laminated on the second transparent conductive film. Touching the surface of the transparent film with a finger or a pen, etc. allows the portions of the two transparent conductive films for which no spacer is provided to come in contact with each other, which makes it possible for the touched input position to be recorded by the machine, terminal, or the like in which the touch panel is used.

This analog type of touch panels can usually be produced by laminating a glass board, on which a first transparent conductive film with microdot spacers formed on its surface is laminated, and a transparent film, on which a second transparent conductive film is laminated, with both the transparent conductive films facing each other and a space left between the both films.

Conventional transparent films on which transparent conductive films are laminated include, for example, a laminate of an indium-tin oxide film (ITO film) and a polyethylene terephthalate film (PET film).

However, in the laminate of an ITO film and a PET film for use in touch panels, its total light transmittance is low compared with a clear hard coat PET film and the color of its transmitted light is yellow, which gives rise to a problem that the produced touch panels is insufficient in visibility, operatability and high-quality impression.

In International Patent Publication WO 00/63924, a transparent touch panel is described, which is a laminate of: a transparent substrate such as a glass board, a polycarbonate sheet or a polyethylene terephthalate sheet; a hard coat layer composed of acrylic resin, etc.; a high refractive index layer composed of $ZrO_2$, $TiO_2$, $Al_2O_3$, etc. whose refractive index is 1.50 to 2.50; a low refractive index layer composed of $SiO_2$, $MgF_2$, etc. whose refractive index is 1.35 to 1.60; and a transparent conductive layer. In this transparent touch panel, its visibility and operatability have been improved to some extent, but they are still insufficient; and moreover, it has a problem of producing transmitted light of yellow color.

In Japanese Patent Laid-Open No. 2000-301648, a transparent touch panel is described which is a laminate of: a transparent substrate such as a polyethylene terephthalate film, a polycarbonate film or a polyarylate film; a hard coat layer composed of acrylic resin etc.; a high refractive index layer composed of a cross-linked product of alkoxides of titanium and zirconium whose refractive index is 1.7 to a refractive index larger than that of a transparent conductive layer by about 0.3; a low refractive index layer composed of a cross-linked product of silicon alkoxode, etc. whose refractive index is 1.35 to 1.5; and a transparent conductive layer.

In this touch panel, however, its transmitted light is colorless or slightly yellowish, but not blue, which is a color desired for touch panels to produce.

Thus, there have been demands for a hard coat film for use in touch panels which has a high total light transmittance and can produce transmitted light of blue color.

SUMMARY OF THE INVENTION

The present invention has been made in the light of the above described situation with regard to the prior art; accordingly, the object of the present invention is to provide a light transmitting hard coat film for use in touch panels which has a high total light transmittance and can produce transmitted light of blue color.

After directing tremendous research efforts toward the solution of the above described problems, the inventors of the present invention have found that when a light transmitting hard coat film includes: (A) a light transmitting hard coat layer composed of a cured product of an ionizing-radiation-curable compound; (B) a high refractive index layer composed of a cured product of an ionizing-radiation-curable compound containing antimony-doped tin oxide plus zirconium oxide and/or titanium oxide, as metal oxides, whose refractive index is in the range of 1.65 to 1.90 and thickness is 30 to 160 nm; and (C) a low refractive index layer composed of a cured product of a siloxane-based curable compound whose refractive index is in the range of 1.40 to 1.55 and thickness is 10 to 50 nm, all the layers being laminated on one side of a light transmitting base film in this order, it has a high total light transmittance and can produce transmitted light of blue color, because reflection of light is suppressed due to the effect of optical interference. And they have accomplished this invention based on this finding.

Specifically, the present invention provides a light transmitting hard coat film for use in touch panels, characterized in that it includes: (A) a light transmitting hard coat layer composed of a cured product of an ionizing-radiation-curable compound; (B) a high refractive index layer composed of a cured product of an ionizing-radiation-curable compound containing antimony-doped tin oxide plus zirconium oxide and/or titanium oxide, as metal oxides, which has a refractive index in the range of 1.65 to 1.90 and a thickness of 30 to 160 nm; and (C) a low refractive index layer composed of a cured product of a siloxane-based curable compound which has a refractive index in the range of 1.40 to 1.55 and a thickness of 10 to 50 nm, all the layers being laminated on one side of a light transmitting base film in this order.

Further, this invention provides a light transmitting hard coat film for use in touch panels, which is the above-described light transmitting hard coat film for use in touch panels further comprising a light transmitting hard coat layer on the opposite side to the side of the light transmitting base film on which the light transmitting hard coat layer (A) composed of a cured product of an ionizing-radiation-curable compound is formed.

Further, this invention provides a light transmitting hard coat film for use in touch panels, which is the above described light transmitting hard coat film for use in touch panels, wherein the light transmitting hard coat layer is an antiglare light transmitting hard coat layer.

Still further, this invention provides a light transmitting hard coat film for use in touch panels, which is the above described light transmitting hard coat film for use in touch panels, wherein the content of the antimony-doped tin oxide in the high refractive index layer is 20 to 90% by mass of the total amount of all the metal oxides.

DETAILED DESCRIPTION OF THE PREFERRED EMBODIMENTS

Figure 1:
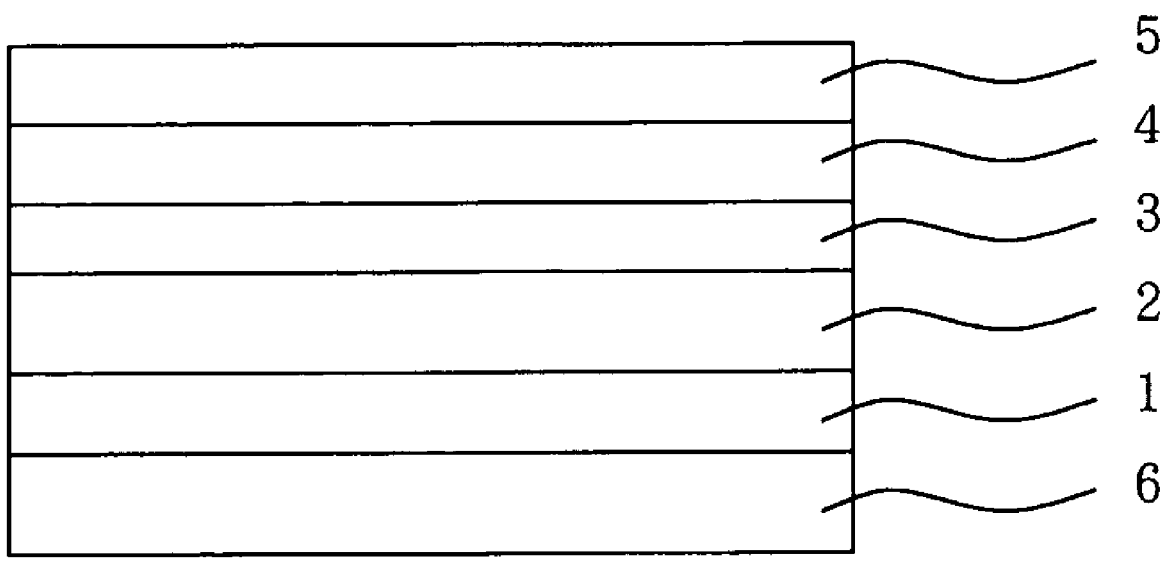
FIG. 1 is a schematic cross-sectional view of one embodiment of light transmitting hard coat film for use in touch panels of the present invention, showing a state in which the light transmitting hard coat film is laminated on a light transmitting conductive layer.

In the following this invention will be described in detail.

The light transmitting hard coat film for use in touch panels of the present invention will be described with reference to the accompanying drawing.

In the light transmitting hard coat film for use in touch panels of the present invention, various types of plastic sheets or films can be used as a light transmitting base film 1.

Concrete examples of the light transmitting base films 1 are films of various types of synthetic resins such as: polyolefin resins such as polyethylene resin and polypropylene resin; polyester resins such as polyethylene terephthalate resin, polyethylene naphthalate resin and polybutylene terephthalate resin; polyvinyl chloride resin; polystyrene resin; polyurethane resin; polycarbonate resin; polyamide resin; polyimide resin and fluororesin. Among the above films, films made of polyester resins such as polyethylene terephthalate resin are particularly preferable because they are highly strong and low-cost. The light transmitting base film 1 may be a single layer or a multi-layer of two layers or more of the same or different types of resins.

The thickness of the light transmitting base film 1 is not limited to any specific value, but generally preferably it is in the range of 10 to 350 μm, more preferably 25 to 300 μm, and particularly preferably 50 to 250 μm.

The surface of the light transmitting base film 1 may be subjected to easy-to-adhere treatment. The easy-to-adhere treatment is not limited to any specific treatment, but it includes: for example, corona discharge treatment; and treatment to provide a layer of a low-molecular weight resin polymer which is composed of the same ingredient as that of the resin of the light transmitting base film 1. For example, when the light transmitting base film 1 is composed of a polyester resin (e.g. polyethylene terephthalate resin), the low-molecular weight resin polymer includes, for example, low-molecular weight polyester (e.g. ethylene terephthalate olygomer).

In the light transmitting hard coat film for use in touch panels of the present invention comprises a light transmitting hard coat layer 2 as a layer (A), which is composed of a cured product of an ionizing-radiation-curable compound, on one side surface of the light transmitting base film 1.

The light transmitting hard coat layer 2 composed of a cured product of an ionizing-radiation-curable compound can be formed by applying a curable composition containing an ionizing-radiation-curable compound on one side surface of the light transmitting base film 1 and exposing the curable composition to ionizing radiation to cure the same.

The thickness of the light transmitting hard coat layer 2 composed of a cured product of an ionizing-radiation-curable compound is not limited to any specific value, but preferably it is in the range of 1 to 50 μm, more preferably 2 to 30 μm, and particularly preferably 3 to 20 μm.

Preferably the light transmitting hard coat layer 2 composed of a cured product of an ionizing-radiation-curable compound is sufficiently hard not to be scratched even when a load of 200 g/cm$^2$ or more, in terms of steel wool hardness, is applied to it.

Ionizing-radiation-curable compounds are cured when exposed to ionizing radiation, and they are classified into, for example, the following types: ultraviolet-curable compounds, electron beam curable compounds, α-ray curable compounds, β-ray curable compounds and γ-ray curable compounds. Of the above types, ultraviolet-curable compounds and electron beam curable compounds are preferable, and ultraviolet-curable compounds are particularly preferable.

The ionizing-radiation-curable compounds include, for example, unsaturated monomers, oligomers, resins, and the compositions containing the same. Concrete examples thereof are multifunctional acrylates and multifunctional ionizing-radiation-curable acrylic compounds having two or more functional groups, such as urethane acrylate and polyester acrylate; of the above acrylates and acrylic compounds, urethane acrylate and polyester acrylate are preferable. Multifunctional acrylates include, for example, ethylene glycol di(meth)acrylate, propylene glycol di(meth)acrylate, butylene glycol di(meth)acrylate, neopentyl glycol di(meth)acrylate, hexanediol di(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, triallyl (meth)acrylate, and bisphenol A ethyleneoxide-modified di(meth)acrylate.

Urethane acrylate is obtained by, for example, esterifying the hydroxyl group of a polyurethaneolygomer, which is obtained by the reaction of a polyether polyol or polyester polyol with polyisocyanate, with (meth)acrylic acid.

Polyester acrylate is obtained by, for example, esterifying the hydroxyl groups of a polyesterolygomer, which is obtained by the condensation of a polyhydric carboxylic acid and a polyhydric alcohol and has hydroxyl groups on both it sends, with (meth)acrylic acid, or esterifying the hydroxyl groups on the ends of an oligomer, which is obtained by the addition of an alkylene oxide to a polyhydric carboxylic acid, with (meth)acrylic acid.

Any one type of ionizing-radiation-curable compounds may be used individually, or in combination of two or more members.

Ionizing radiation is classified into the following categories: ultraviolet radiation, electron beam, α-ray, β-ray and γ-ray. When using ultraviolet radiation, it is preferable that the curable composition contains a photopolymerization initiator. As the photopolymerization initiator, known polymerization initiators, such as acetophenone-based and benzophenone-based initiators, can be used, and in addition, an oligomer type of photopolymerization initiators can also be used.

Such photopolymerization initiators may be used individually, or in combination of two or more members.

A preferred blending ratio of a photopolymerization initiator to an ionizing-radiation-curable compound is usually 0.01 to 20 parts by mass, particularly preferably 0.1 to 10 parts by mass per 100 parts by mass of the ionizing-radiation-curable compound.

In the light transmitting hard coat film for use in touch panels of this invention, if an oligomer type of photopolymerization initiator is used, gas generation arising from the use of a polymerization initiator can be almost completely prevented.

The curable composition may contain a filler such as silica (including colloidal silica), silicone powder, mica, glass beads, acrylic impalpable powder or hollow particles to impart an antiglare property to the light transmitting hard coat film. In this case, a preferred blending ratio of the filler to the ionizing-radiation-curable compound is 0.5 to 50 parts by mass per 100 parts by mass of the ionizing-radiation-curable compound. If the amount of the filler is less than 0.5 parts by mass per 100 parts of the ionizing-radiation-curable compound, the antiglare property is lowered, whereas if the amount of the filler is more than 50 parts by mass per 100 parts of the ionizing-radiation-curable compound, the strength of the light transmitting hard coat film is lowered.

The curable composition may contain an anti-bacteria agent. As the anti-bacteria agent, various types of anti-bacteria agents, such as a silver-based inorganic anti-bacteria agent whose carrier is zirconium, a silver-based inorganic anti-bacteria agent whose carrier is zeolite, a silver-based inorganic anti-bacteria agent whose carrier is calcium phosphate, a silver-based inorganic anti-bacteria agent whose carrier is silica gel, amino acid-based organic anti-bacteria agents such as organic anti-bacteria agents in which amino acid compounds are blended, and organic anti-bacteria agents in which nitrogen-containing sulfur based compounds are blended, can be used. The amount of the anti-bacteria agent blended can be appropriately selected depending on the type of the anti-bacteria agent used, the required antibacteria properties and the retention time of the antibacteria properties.

Further, the curable composition may arbitrarily contain additives such as a light stabilizer, an ultraviolet radiation absorber, a catalyst, a colorant, an antistatic agent, a lubricant, a leveling agent, an anti-foaming agent, a polymerization promoter, an antioxidant, a flame retarder, an infrared absorber, a surfactant and a surface modifier.

The curable composition may contain a diluent so that it becomes easier to coat. The diluents include: for example, alcohols such as isobutanol and isopropanol; aromatic hydrocarbons such as benzene, toluene and xylene; aliphatic hydrocarbons such as hexane, heptane, octane, nonane and decane; and ketones such as methyl ethyl ketone, diethyl ketone and di-isopropyl ketone. The amount of the diluent blended can be appropriately selected so that the curable composition has a required viscosity.

In the light transmitting hard coat film for use in touch panels of this invention, any one of the above described curable compositions is applied on the surface of the light transmitting base film. When the curable composition contains a diluent, it is exposed to ionizing radiation after dried so that it is cured and forms a hard coat layer.

The thickness of the light transmitting hard coat layer is not limited to any specific value, but the preferred thickness is usually 1 to 50 μm, more preferably 2 to 30 μm, and particularly preferably 3 to 20 μm.

The methods of applying the above curable composition to the light transmitting base film include, for example, conventionally known methods such as bar coating, knife coating, roll coating, blade coating, die coating, gravure coating and curtain coating.

As the ionizing radiation to which the curable composition is exposed, ionized radiation generated from various types of ionized radiation generators is used. For example, when the ionized radiation is ultraviolet radiation, usually ultraviolet radiation radiated from an ultraviolet lamp is used. As the ultraviolet lamp, a high pressure mercury lamp, a fusion H lamp or a xenon lamp that emits a ultraviolet radiation having a spectrum distribution in the wave range of 300 to 400 nm is used, and the preferred exposed dose is usually 50 to 3000 mJ/cm$^2$.

In the light transmitting hard coat film for use in touch panels of this invention, a high refractive index layer 3, as a (B) layer, is laminated on the surface of the light transmitting hard coat layer 2, as a (A) layer, which is composed of a cured product of an ionized radiation curable compound. The high refractive index layer 3 is a layer composed of an ionized radiation curable compound and containing antimony-doped tin oxide plus zirconium oxide and/or titanium oxide, as metal oxides, whose refractive index is in the range of 1.65 to 1.90 and thickness is in the range of 30 to 160 nm, preferably in the range of 50 to 100 nm.

The high refractive index layer 3 contains antimony-doped tin oxide, and in addition, either zirconium oxide or titanium oxide or both the metal oxides. Containing these metal oxides allows its refractive index to fall in the range of 1.65 to 1.90. Antimony-doped tin oxide enables the improvement of the adhesion between the high refractive index layer 3 and a low refractive index layer 4.

Antimony-doped tin oxide is obtained by doping a small amount of antimony to tin oxide.

In antimony-doped tin oxide, the amount of antimony doped is preferably 1 to 20% by mass. The content of antimony-doped tin oxide is preferably 20 to 90% by mass of the total amount of antimony-doped tin oxide plus zirconium oxide and/or titanium oxide, more preferably 25 to 70% by mass, and particularly preferably 30 to 65% by mass. If the content of antimony-doped tin oxide is lower than the above range, the effect of improving the adhesion between the high refractive index layer 3 and the low refractive index layer 4 is lowered, whereas if the content exceeds the above range, the total light transmittance is decreased.

In the high refractive index layer 3, the content of antimony-doped tin oxide plus zirconium oxide and/or titanium oxide is preferably 40 to 90% by mass of the total amount of the ionizing-radiation-curable compound and the metal oxides, particularly preferably 60 to 85% by mass.

The average particle diameter of antimony-doped tin oxide, zirconium oxide and titanium oxide is preferably 10 to 500 nm, particularly preferably 50 to 150 nm.

The high refractive index layer 3 can be formed by applying to the (A) layer a curable composition obtained by mixing an ionizing-radiation-curable compound similar to that used for forming the above (A) layer and antimony-doped tin oxide plus zirconium oxide and/or titanium oxide, as metal oxides and exposing the applied curable composition to ionizing radiation to cure the same.

In the light transmitting hard coat film for use in touch panels of this invention, a low refractive index layer 4 as a (C) layer is laminated on the high refractive index layer 3 as a (B) layer. The low refractive index layer 4 is a layer which is composed of a cured product of a siloxane-based curable compound and whose refractive index is in the range of 1.40 to 1.55, preferably in the range of 1.40 to 1.50 and thickness is in the range of 10 to 50 nm, preferably in the range of 10 to 30 nm.

Preferred siloxane-based curable compounds include, for example, silicon alkoxides. Silicon alkoxides include, for example, tetramethoxysilane, tetraethoxysilane, methyltrimethoxysilane, methyltriethoxysilane, dimethyldimethoxysilane, γ-glycidoxypropyl-trimethoxysilane, vinyltrimethoxysilane, and the partially hydrolyzed products thereof. Silicon alkoxides are hydrolyzed by moisture in the air etc. and cross-linked by dehydration condensation to be formed into a cured product of the siloxane-based curable compound.

The siloxane-based curable compounds are preferably in the form of colloidal particles. The average diameter of the colloidal particles is preferably 1 to 100 nm.

The low refractive index layer 4 can be formed by applying a curable composition containing a siloxane-based curable compound on the surface of the (B) layer and curable the same. Preferably the curing is achieved by heating. And the heating temperature is preferably 100 to 150° C.

The light transmitting hard coat film for use in touch panels of this invention is used preferably with a light transmitting conductive layer 5 laminated on the surface of the low refractive index layer 4 as a (C) layer.

Suitable light transmitting conductive layer 5 include, for example, an ITO film. ITO is indium doped tin oxide and the ITO film can be formed of ITO by subjecting the same to cathode sputtering process.

The thickness of the light transmitting conductive layer 5 is preferably 10 to 40 nm, particularly preferably 20 to 30 nm.

In the light transmitting hard coat film for use in touch panels of this invention, it is preferable to provide a light transmitting hard coat layer 6 on the opposite side surface to the side of the light transmitting base film 1 on which the light transmitting hard coat layer 2, as an (A) layer, composed of a cured product of an ionizing-radiation-curable compound is formed.

The light transmitting hard coat layer 6 may be composed of the same material as the cured product of the ionizing-radiation-curable compound which forms the (A) layer.

The thickness of the light transmitting hard coat layer 6 is not limited to any specific value, but preferably it is 2 to 20 μm, more preferably 3 to 18 μm, and particularly preferably 4 to 15 μm.

The hardness of the light transmitting hard coat layer 6 is preferably such that it is sufficient not to be scratched even when a load of 200 g/cm$^2$ or more, in terms of steel wool hardness, is applied to the layer.

Preferably the light transmitting hard coat film of this invention has a total light transmittance of 87.0% or more, more preferably 88.0% or more.

The chromaticness coordinates b* value of the light transmitting hard coat film of this invention in accordance with the a*b* color specification system specified in Japan Industrial Standard Z 8729 is preferably 0.5 to 4.0, more preferably 1.0 to 2.0, and particularly preferably 1.3 to 2.0.

The color of the light transmitted by the light transmitting hard coat of this invention is preferably blue or bluish green, but blue is more preferable.

EXAMPLES

In the following this invention will be described in further detail taking several examples. However, it should be understood that these examples are not intended to limit this invention.

(Preparation of Ingredients)

Preparation of Curable Composition 1 for Forming Light Transmitting Hard Coat Layer A solution was prepared by adding 150 parts by mass of toluene, as a diluent, to 100 parts by mass of a mixture of urethane acrylate, as an ultraviolet-curable compound, and a photopolymerization initiator (Arakawa Chemical Industries, Ltd., brand name: BEAM SET 575 CB) and used as a curable composition 1 for forming a light transmitting hard coat layer.

Preparation of Curable Composition 2 for Forming Light Transmitting Hard Coat Layer A solution was prepared by adding 150 parts by mass of toluene, as a diluent, to a mixed solution obtained by adding 2 parts by mass of a photopolymerization initiator (Ciba Specialty Chemicals, brand name: IRGACURE 907) to 98 parts by mass of urethane acrylate (Arakawa Chemical Industries, Ltd., brand name: BEAM SET 577), as a ultraviolet-curable compound, and used as a curable composition 2 for forming a light transmitting hard coat layer.

Preparation of Curable Composition 3 for Forming Antiglare Light Transmitting Hard Coat Layer A solution was prepared by adding 180 parts by mass of isobutanol to a mixed solution, which is obtained by adding 20 parts by mass of a mixture of polyester acrylate and silica gel (Dainichiseika Color & Chemicals Mfg. Co., Ltd., brand name: SEIKABEAM EXF-01L(BS), silica gel content: 10% by mass) and 2 parts by mass of a photopolymerization initiator (Ciba Specialty Chemicals, brand name: IRGACURE 907) to 98 parts by mass of polyester acrylate (Dainichiseika Color & Chemicals Mfg. Co., Ltd., brand name: SEIKABEAM EXF-01L(NPI)), as a ultraviolet-curable compound, and used as a curable composition 3 for forming an antiglare light transmitting hard coat layer.

Preparation of Curable Composition 4 for Forming High Refractive Index Layer

A solution was prepared by adding 2870 parts by mass of isobutanol to a mixed solution of 100 parts by mass of a mixture of urethane acrylate as an ultraviolet-curable compound, a photopolymerization initiator and zirconium oxide (JSR Co., Ltd., brand name: DESOLITE KZ 7252C, solid content: 45% by mass, zirconium oxide accounted for 68% by mass of the solid content) and 180 parts by mass of 10% by mass antimony-doped tin oxide dispersion in isobutanol (Dai Nippon Ink and Chemicals, Inc., brand name: TA-01D) and used as a curable composition 4 (solid content concentration: 2.0% by mass) for forming a high refractive index layer. The content of antimony-doped tin oxide in the curable composition 4 was 37% by mass of the total amount of antimony-doped tin oxide and zirconium oxide.

Preparation of Curable Composition 5 for Forming High Refractive index Layer

A curable composition 5 (solid content concentration: 2.0% by mass) for forming a high refractive index layer was prepared in the same manner as the curable composition 4 for forming a high refractive index layer, except that the amount of the antimony-doped tin oxide dispersion in isobutanol, TA-01D, mixed was 450 parts by mass and the amount of isobutanol added was 3950 parts by mass.

The content of antimony-doped tin oxide in the curable composition was 60% by mass of the total amount of antimony-doped tin oxide and zirconium oxide.

Preparation of Curable Composition 6 for Forming High Refractive index Layer

A solution was prepared by adding 16900 parts by mass of isobutanol to a mixed solution of 100 parts by mass of a mixture of polyester acrylate as an ultraviolet-curable compound and a photopolymerization initiator (Dainichiseika Color & Chemicals Mgf. Co., Ltd., brand name: SEIKABEAM EXF-01L (NS)) and 3000 parts by mass of antimony-doped tin oxide dispersion in isobutanol (Dai Nippon Ink and Chemicals, Inc., brand name: TA-01D) and used as a curable composition 6 (solid content concentration: 2.0% by mass) for forming a high refractive index layer. The metal oxide contained in the curable composition was only antimony-doped tin oxide.

Preparation of Curable Composition 7 for Forming High Refractive index Layer

A solution was prepared by adding 1300 parts by mass of isobutanol to a mixed solution of 100 parts by mass of a mixture of urethane acrylate, a photopolymerization initiator and titanium oxide (Nippon Kayaku Co., Ltd., brand name: KAYANOVA MHR-101, solid content: 20% by mass, titanium oxide accounted for 65% by mass of the solid content)) and 100 parts by mass of antimony-doped tin oxide dispersion in isobutanol (Dai Nippon Ink and Chemicals Inc., brand name: TA-01D) and used as a curable composition 7 (solid content concentration: 2.0% by mass) for forming a high refractive index layer. The content of antimony-doped tin oxide in the curable composition 7 was 43% by mass of the total amount of antimony-doped tin oxide and titanium oxide.

Preparation of Curable Composition 8 for Forming Low Refractive Index Layer

A solution was prepared by adding 900 parts by mass of isobutanol to 100 parts by mass of a dispersion of a siloxane-based curable compound (COLCOAT Co., Ltd., brand name: COLCOAT P, the concentration of the siloxane-based curable compound: 2% by mass, dispersant: isobutanol, the average particle diameter of colloidal particles: about 6 nm) and used as a curable composition 8 (solid content concentration: 2.0% by mass) for forming a low refractive index layer.

Hard Coat Film 1

The curable composition 1 was applied on the surface of a polyethylene terephthalate resin film (Toyobo Co., Ltd., brand name: PET188A4300, 188 μm thick), as a light transmitting base film, with a Meyer bar #10 in such a manner that the resultant layer after drying and curing was 4 μm thick, dried at 70° C. for 1 minute, and exposed to ultraviolet radiation (1000 mJ/cm$^2$) to form a light transmitting hard coat layer. Subsequently after that, on the opposite side to the side of the polyethylene terephthalate resin film on which the light transmitting hard coat layer had been provided the curable composition 2 was applied with a Meyer bar #10 in such a manner that the resultant layer after drying was 4 μm thick, dried at 70° C. for 1 minute, and exposed to ultraviolet radiation (100 mJ/cm$^2$) to form a light transmitting hard coat layer. Thus, a hard coat film 1 was obtained.

Hard Coat Film 2

The curable composition 1 was applied on the surface of a polyethylene terephthalate resin film (Toyobo Co., Ltd., brand name: PET188A4300, 188 μm thick), as a light transmitting base film, with a Meyer bar #10 in such a manner that the resultant layer after drying and curing was 4 μm thick, dried at 70° C. for 1 minute, and exposed to ultraviolet radiation (1000 mJ/cm$^2$) to form a light transmitting hard coat layer. Subsequently after that, on the opposite side to the side of the polyethylene terephthalate resin film on which the light transmitting hard coat layer had been provided the curable composition 3 was applied with a Meyer bar #10 in such a manner that the resultant layer after drying was 4 μm thick, dried at 70° C. for 1 minute, and exposed to ultraviolet radiation (100 mJ/cm$^2$) to form an antiglare light transmitting hard coat layer. Thus, a hard coat film 2 was obtained.

Example 1

The curable composition 4 was applied on the surface of the light transmitting hard coat layer of the hard coat film 1, which was obtained by curing the curable composition 2, with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 2

The curable composition 5 was applied on the surface of the light transmitting hard coat layer of the hard coat film 1, which was obtained by curing the curable composition 2, with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 3

The curable composition 7 was applied on the surface of the light transmitting hard coat layer of the hard coat film 1, which was obtained by curing the curable composition 2, with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 4

The curable composition 4 was applied on the surface of the antiglare light transmitting hard coat layer of the hard coat film 2 with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 5

The curable composition 4 was applied on the surface of the light transmitting hard coat layer of the hard coat film 1, which was obtained by curing the curable composition 2, with a Meyer bar #12 in such a manner that the resultant layer after drying and curing was 100 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 6

The curable composition 4 was applied on the surface of the light transmitting hard coat layer of the hard coat film 1, which was obtained by curing the curable composition 2, with a Meyer bar #8 in such a manner that the resultant layer after drying and curing was 50 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #12 in such a manner that the layer after drying was 15 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Example 7

The curable composition 4 was applied on the surface of the light transmitting hard coat layer of the hard coat film 1, which was obtained by curing the curable composition 2, with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #16 in such a manner that the layer after drying was 20 nm and dried at 130° C. for 1 minute to form a low refractive index layer. Thus, a light transmitting hard coat film for use in touch panels was obtained. Then, on the low refractive index layer, an ITO film was deposited in such a manner that the film thickness was 25 nm.

Comparative Example 1

The curable composition 4 was applied on the surface of the light transmitting hard coat layer of the hard coat film 1, which was obtained by curing the curable composition 2, with a Meyer bar #16 in such a manner that the resultant layer after drying and curing was 200 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #16 in such a manner that the layer after drying was 30 nm and dried at 130° C. for 1 minute to form a low refractive index layer. Then, on the low refractive index layer, an ITO film was deposited in such a manner that the film thickness was 25 nm. Thus, a light transmitting hard coat film was obtained.

Comparative Example 2

An ITO film was deposited on the surface of the light transmitting hard coat layer of the hard coat film 1, which was obtained by curing the curable composition 2, in such a manner that the resultant layer was 25 nm thick. Thus, a light transmitting hard coat film was obtained.

Comparative Example 3

The curable composition 6 was applied on the surface of the light transmitting hard coat layer of the hard coat film 1, which was obtained by curing the curable composition 2, with a Meyer bar #10 in such a manner that the resultant layer after drying and curing was 70 nm thick, dried at 70° C. for 1 minute, and exposed to ultraviolet radiation (1000 mJ/cm$^2$) to form a high refractive index layer. Subsequently after that, the curable composition 8 was applied on the surface of the high refractive index layer with a Meyer bar #10 in such a manner that the layer after drying was 10 nm and dried at 130° C. for 1 minute to form a low refractive index layer. Then, on the low refractive index layer, an ITO film was deposited in such a manner that the film thickness was 5 nm. Thus, a light transmitting hard coat film was obtained. The metal oxide contained in the high refractive index layer of the light transmitting hard coat film was only antimony-doped tin oxide.

The properties of the light transmitting hard coat films of examples and comparative examples are shown in Table 1 and Table 2.

Their total light transmittance, haze, color (a* value, b* value) and steel wool hardness were measured and evaluated by the procedures shown below.

(1) Total Light Transmittance and Haze

The total light transmittance and haze were measured with a light transmittance measuring apparatus (Nippon Denshoku Industries Co., Ltd., brand name: NDH 2000).

(2) Color (a* value, b* value)

The calculation of color was performed with a colorimeter (Nippon Denshoku Industries Co., Ltd., brand name: SQ 2000). As a light source, a standard light D 65 specified in Japan Industrial Standard Z 8720 was employed, and measurements were made under the condition of 2 degrees visual field.

(3) Steel Wool Hardness

A steel wool was rubbed against the surface of each low refractive index layer and force 10 times while applying a pressure of 200 g/cm² thereto. And the surface was visually observed and evaluated adopting the criterion shown below.

N: No scratches were observed.

A: Scratches were observed.

(4) Measurement of Refractive Index of High Refractive Index Layer

Each curable composition whose solid content had been adjusted to 10% by mass was applied on the surface of a glass sheet with a Meyer bar #10, dried at 70° C. for 1 minute, and exposed to ultraviolet radiation (1000 mJ/cm²) to form a high refractive index layer. And the refractive index of the layer was measured with a thin-film measurement system (Filmetrics Co., Ltd., brand name: F 20).

(5) Measurement of Refractive Index of Low Refractive Index Layer

Each curable composition whose solid content had been adjusted to 2% by mass was applied on the surface of a glass sheet with a Meyer bar #20, heated at 130° C. for 1 minute to form a low refractive index layer. And the refractive index of the layer was measured with a thin-film measurement system, just like the measurement of the high refractive index layer.

In the hard coat films of examples 1 to 7, their total light transmittance is high compared with that of the hard coat films of Comparative Examples 1 to 3 and they produce transmitted light of blue-based color. When the difference in total light transmittance is 1.0%, the difference in transparency in touch panels is apparent visually.

The light transmitting hard coat film for use in touch panels of this invention has high total light transmittance because reflection of light is suppressed due to the effect of optical interference and can produce transmitted light of blue color.

What is claimed is:

1. A light transmitting hard coat film for use in touch panels, which comprises: (A) a light transmitting hard coat layer composed of a cured product of an ionizing-radiation-curable compound; (B) a high refractive index layer composed of a cured product of an ionizing-radiation-curable compound and containing antimony-doped tin oxide plus zirconium oxide and/or titanium oxide, as metal oxides, which has a reflective index in the range of 1.65 to 1.90 and the thickness of 30 to 160 nm and wherein the antimony-doped tin oxide plus zirconium oxide and/or titanium oxide in the high refractive index layer is 40 to 90% by mass of the total amount of the ionizing radiation curable compound and the metal oxides and wherein the antimony doped tin oxide in the high refractive index layer is 20 to 90% by mass of the total amount of all the metal oxides; and (C) a low refractive

TABLE 1

|  |  | Example 1 | Example 2 | Example 3 | Example 4 | Example 5 |
|---|---|---|---|---|---|---|
| High refractive index layer | Film thickness (nm) | 70 | 70 | 70 | 70 | 100 |
|  | Refractive index | 1.70 | 1.78 | 1.78 | 1.70 | 1.70 |
| Low refractive index layer | Film thickness (nm) | 15 | 15 | 15 | 15 | 15 |
|  | Refractive index | 1.45 | 1.45 | 1.52 | 1.52 | 1.45 |
| Thickness of ITO film (nm) |  | 25 | 25 | 25 | 25 | 25 |
| Total light transmittance (%) |  | 89.1 | 88.5 | 88.4 | 89.0 | 89.6 |
| Haze |  | 0.4 | 0.5 | 0.5 | 3.1 | 0.4 |
| a* |  | −1.1 | −1.0 | −0.5 | −0.9 | −1.3 |
| b* |  | 1.9 | 2.0 | 1.4 | 0.9 | 3.2 |
| Color of transmitted light |  | Light blue | Light blue | Light blue | Light blue | Light green |
| Steel wool hardness |  | N | N | N | N | N |

TABLE 2

|  |  | Example 6 | Example 7 | Comparative Example 1 | Comparative Example 2 | Comparative Example 3 |
|---|---|---|---|---|---|---|
| High refractive index layer | Film thickness (nm) | 50 | 70 | 200 | — | 70 |
|  | Refractive index | 1.70 | 1.70 | 1.70 | — | 1.74 |
| Low refractive index layer | Film thickness (nm) | 15 | 20 | 30 | — | 10 |
|  | Refractive index | 1.45 | 1.45 | 1.45 | — | 1.45 |
| Thickness of ITO film (nm) |  | 25 | 25 | 25 | 25 | 25 |
| Total light transmittance (%) |  | 88.1 | 87.0 | 86.9 | 85.3 | 86.1 |
| Haze |  | 0.4 | 0.4 | 0.4 | 0.6 | 0.5 |
| a* |  | −1.0 | −1.4 | −2.0 | −0.2 | −0.6 |
| b* |  | 1.9 | 3.7 | 2.8 | 4.1 | 2.1 |
| Color of transmitted light |  | Light blue | Light green | Yellow | Yellow | Pale yellow |
| Steel wool hardness |  | N | N | N | N | N | index layer composed of a cured product of a siloxane-based curable compound which has a refractive index in the range of 1.40 to 1.55 and a thickness of 10 to 50 nm, all the layers being laminated on one side of a light transmitting base film in this order.

2. The light transmitting hard coat film for use in touch panels as claimed in claim 1, which comprises further a light transmitting hard coat layer on the opposite side surface to the side of the light transmitting base film on which the light transmitting hard coat layer (A) composed of a cured product of an ionizing-radiation-curable compound is formed.

3. The light transmitting hard coat film for use in touch panels as claimed in claim 1, wherein the light transmitting hard coat layer is an antiglare light transmitting hard coat layer.

4. The light transmitting hard coat film for use in touch panels as claimed in claim 1, wherein the content of the antimony-doped tin oxide in the high refractive index layer is 20 to 60% by mass of the total amount of all the metal oxides.

* * * * *